United States Patent
Tsukagoshi et al.

(10) Patent No.: US 7,872,787 B2
(45) Date of Patent: Jan. 18, 2011

(54) HOLOGRAPHIC MULTIPLEX RECORDING METHOD, HOLOGRAPHIC RECORDING APPARATUS AND HOLOGRAPHIC RECORDING MEDIUM EMPLOYING THE METHOD USING INTERFERENCE FRINGES

(75) Inventors: Takuya Tsukagoshi, Sagamihara (JP); Jiro Yoshinari, Tokyo (JP); Hideaki Miura, Tokyo (JP); Tetsuro Mizushima, Moriguchi (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/461,247

(22) Filed: Aug. 5, 2009

(65) Prior Publication Data

US 2010/0014137 A1    Jan. 21, 2010

Related U.S. Application Data

(62) Division of application No. 10/583,604, filed as application No. PCT/JP2004/018165 on Dec. 6, 2004, now abandoned.

(30) Foreign Application Priority Data

Dec. 26, 2003    (JP) .............................. 2003-434319

(51) Int. Cl.
    *G03H 1/26* (2006.01)
(52) U.S. Cl. ................. 359/22; 359/3; 359/35

(58) Field of Classification Search .................. None
    See application file for complete search history.

(56) References Cited

U.S. PATENT DOCUMENTS 6,806,982 B2    10/2004    Newswanger et al.
7,218,597 B2 *    5/2007    Yasuda et al. ............... 369/103

FOREIGN PATENT DOCUMENTS

| JP | A-07-013474 | 1/1995 |
| JP | A-07-160183 | 6/1995 |
| JP | A-2003-178460 | 6/2003 |

OTHER PUBLICATIONS

F.H. Mok, M.C. Tackitt, H.M. Stoll, "Storage of 500 high-resolution holograms in a LiNbO3 crystal", Opt. Lett. vol. 16, No. 8, Apr. 15, 1991, pp. 605-607.

* cited by examiner

*Primary Examiner*—Arnel C Lavarias
(74) *Attorney, Agent, or Firm*—Oliff & Berridge, PLC

(57) ABSTRACT

A holographic multiplex recording method which can keep a recording data rate constant and equalize nonuniformity in recording due to vibrations or the like, and a holographic recording apparatus and a holographic recording medium, which employ the method. In a process of multiplex-recording information, the time of exposure to a laser beam per data page is kept constant, and the laser output power of the laser beam is increased in accordance with a decrease in recording sensitivity of the holographic recording medium.

12 Claims, 4 Drawing Sheets

(A)

(B)

PRIOR ART

US 7,872,787 B2

HOLOGRAPHIC MULTIPLEX RECORDING METHOD, HOLOGRAPHIC RECORDING APPARATUS AND HOLOGRAPHIC RECORDING MEDIUM EMPLOYING THE METHOD USING INTERFERENCE FRINGES

This is a Division of application Ser. No. 10/583,604 filed Jun. 20, 2006, which in turn is a National Stage of Application No. PCT/JP2004/018165 filed Dec. 6, 2004. The disclosure of the prior applications is hereby incorporated by reference herein in its entirety.

TECHNICAL FIELD

The present invention relates to a holographic multiplex recording method, and a holographic recording apparatus and a holographic recording medium which employ the method.

BACKGROUND

As shown in FIG. 4, conventionally suggested as one of holographic recording methods is a holographic multiplex recording method based on angle multiplexing, in which the incident angle of a reference beam 6 is modulated while the incident angle of an object beam 4 is kept constant with respect to a recording layer 2A in a holographic recording medium 2 (e.g., see Japanese Patent Laid-Open Publication No. 2003-178460).

Note that since such angle multiplex recording allows a number of multiplexed holograms to be provided in the same area of a recording material, the amount of exposure for recording needs to be increased step by step as the multiplex recording proceeds. Thus, "scheduling of recording" is carried out to control the amount of exposure for recording according to the history of recording on the recording material or the residual dynamic range.

This "scheduling of recording" will now be explained in more detail with reference to FIG. 5. Note that FIG. 5 shows the relationship among the amount of exposure, the refractive index modulation degree, and the recording sensitivity for the holographic recording medium 2, in which the maximum refractive index modulation degree for a photosensitive material of the holographic recording medium 2 is n1, and both the refractive index modulation degree and the recording sensitivity are normalized to have a maximum value of one.

For example, to record N data pages by angle multiplex recording, the maximum refractive index modulation degree n1 is divided into N equal parts, and the refractive index modulation degree per data page n1/N is kept constant. However, since a photosensitive component in the photosensitive material decreases as the multiplex recording proceeds causing degradation in photosensitivity (recording sensitivity) to a laser beam, the refractive index modulation degree and the exposure time t exhibit a nonlinear relationship. Accordingly, in order to keep the refractive index modulation degree per data page n1/N constant, the exposure time t needs to be varied for each data page to increase the amount of exposure E(t) step by step.

As described above, the time t of exposure to a laser beam had to be varied in the conventional recording scheduling. Accordingly, this causes control to be readily complicated and the time required for recording to vary for each data page, resulting in inconsistency in recording data rate.

Furthermore, there is a problem with the holographic recording that microscopic vibrations or scintillations during recording cause blurring (nonuniformity in recording) to occur in interference fringes. In addition, there is a problem that different exposure times t for each data page cause such blurring to have inconsistent effects thereby impeding proper data readout.

SUMMARY

The present invention has been made to solve the above-mentioned problems. It is therefore an object of the invention to provide a holographic multiplex recording method which can provide a constant recording data rate and equalize non-uniformity in recording due to vibrations or the like, and a holographic recording apparatus and a holographic recording medium which employ the method.

The present inventors have conducted intensive studies and consequently found that a holographic multiplex recording method which can provide a constant recording data rate and equalize nonuniformity in recording due to vibrations or the like, and a holographic recording apparatus and a holographic recording medium which employ the method.

In summary, the above-described objectives are achieved by the following embodiments of the present invention.

(1) A holographic multiplex recording method for multiplex-recording information as a hologram on a holographic recording medium using interference fringes of an object beam and a reference beam, into which a laser beam is split, wherein in a process of multiplex-recording the information, a time of exposure to the laser beam per data page is kept constant, and a laser output power of the laser beam is increased in accordance with a decrease in recording sensitivity of the holographic recording medium.

(2) A holographic multiplex recording method for multiplex-recording information as a hologram on a holographic recording medium using interference fringes of an object beam and a reference beam, into which a laser beam is split, wherein in a process of multiplex-recording the information, a time of exposure to the laser beam per data page and a laser output power are kept constant, and a spatial light modulator having a plurality of pixels for intensity modulating of the object beam is used to increase the number of pixels of the spatial light modulator to be allocated to one bit of the information in accordance with a decrease in recording sensitivity of the holographic recording medium.

(3) The holographic multiplex recording method according to (2), wherein an array of pixels of the spatial light modulator to be allocated to one bit of the information is formed in a square grid shape.

(4) The holographic multiplex recording method according to (2) or (3), wherein, when a recording sensitivity of the holographic recording medium is reduced to less than or equal to $1/N^2$ (N is an integer equal to two or greater) of an initial value of the recording sensitivity, the number of pixels of the spatial light modulator to be allocated to one bit of the information is increased to $N^2$.

(5) A holographic recording apparatus for multiplex-recording information as a hologram on a holographic recording medium using interference fringes of an object beam and a reference beam, into which a laser beam is split, wherein in a process of multiplex-recording the information, a time of exposure to the laser beam per data page is kept constant, and a laser output power of the laser beam can be increased in accordance with a decrease in recording sensitivity of the holographic recording medium.

(6) A holographic recording apparatus for multiplex-recording information as a hologram on a holographic recording medium using interference fringes of an object beam and a reference beam, into which a laser beam is split, includes a spatial light modulator having a plurality of pixels for intensity modulating of the object beam, and wherein in a process of multiplex-recording the information, a time of exposure to the laser beam per data page and a laser output power are kept constant, and the number of pixels of the spatial light modulator to be allocated to one bit of the information is set to increase in accordance with a decrease in recording sensitivity of the holographic recording medium.

(7) The holographic recording apparatus according to (6), wherein an array of pixels of the spatial light modulator to be allocated to one bit of the information is formed in a square grid shape.

(8) The holographic recording method according to (6) or (7), wherein the number of pixels of the spatial light modulator to be allocated to one bit of the information is set to increase to $N^2$ when a recording sensitivity of the holographic recording medium is reduced to less than or equal to $1/N^2$ (N is an integer equal to two or greater) of an initial value of the recording sensitivity.

(9) A holographic recording medium on which information is multiplex recorded as a hologram using interference fringes of an object beam and a reference beam, into which a laser beam is split, wherein a time of exposure to the laser beam and a laser output power are kept constant, and a spatial light modulator having a plurality of pixels for intensity modulation of the object beam is used to increase the number of pixels of the spatial light modulator to be allocated to one bit of the information in accordance with a decrease in recording sensitivity of the holographic recording medium, thereby allowing the information to be multiplex-recorded.

(10) The holographic recording medium according to (9), wherein an array of pixels of the spatial light modulator to be allocated to one bit of the information is formed in a square grid shape, thereby allowing the information to be multiplex-recorded.

(11) The holographic recording medium according to (9) or (10), wherein, when a recording sensitivity of the holographic recording medium is reduced to less than or equal to $1/N^2$ (N is an integer equal to two or greater) of an initial value of the recording sensitivity, the number of pixels of the spatial light modulator to be allocated to one bit of the information is increased to $N^2$, thereby allowing the information to be multiplex-recorded.

DETAILED DESCRIPTION OF EMBODIMENTS

The present invention relates to a holographic multiplex recording method for multiplex-recording information as a hologram on a holographic recording medium using interference fringes of an object beam and a reference beam, into which a laser beam is split. In the process of multiplex-recording the information, the method allows the time of exposure to the laser beam per data page to be kept constant and the laser output power of the laser beam to be increased in accordance with a decrease in recording sensitivity of the holographic recording medium, thereby solving the aforementioned problems.

The present invention also relates to a holographic multiplex recording method for multiplex-recording information as a hologram on a holographic recording medium using interference fringes of an object beam and a reference beam, into which a laser beam is split. In the process of multiplex-recording the information, the method allows the time of exposure to the laser beam per data page and the laser output power to be kept constant. The method also allows a spatial light modulator having a plurality of pixels for intensity modulation of the object beam to be used to increase the number of pixels of the spatial light modulator that are allocated to one bit of the information in accordance with a decrease in recording sensitivity of the holographic recording medium. This can solve the same aforementioned problems.

First Embodiment

Figure 1:
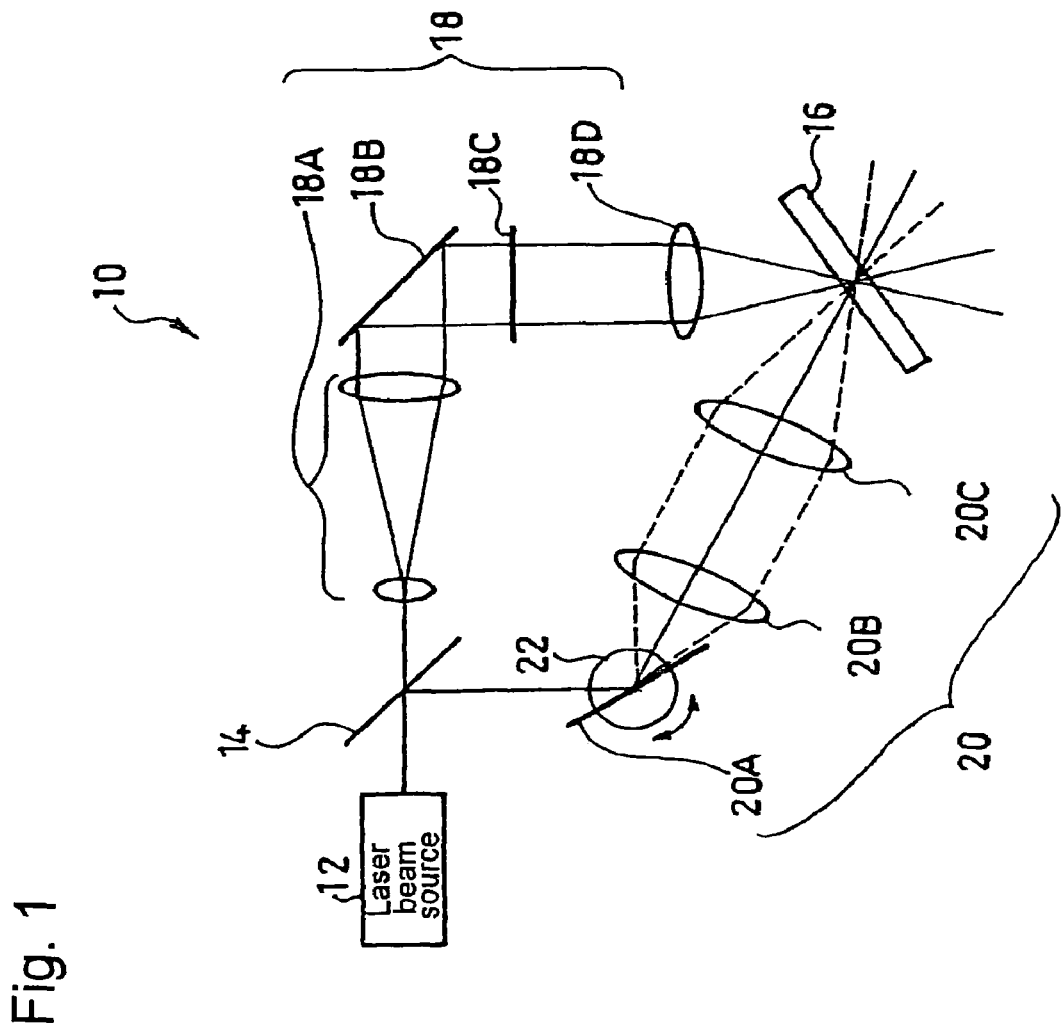
FIG. 1 is an optical system diagram illustrating a holographic recording apparatus to which a holographic multiplex recording method according to a first embodiment of the present invention is applied.

Now, with reference to FIG. 1, a description will be given of a holographic recording apparatus 10 to which a holographic multiplex recording method according to a first embodiment of the present invention is applied.

The holographic recording apparatus 10 is configured to include: a laser beam source 12; a polarizing beam splitter 14 for transmitting one of linear polarizations having orthogonal planes of oscillation of a laser beam from the laser beam source 12, for example, a p-polarized component, and for reflecting an s-polarized component; an object optical system 18 for guiding the p-polarized component having transmitted through the polarizing beam splitter 14 to a holographic recording medium 16; and a reference optical system 20 for guiding the s-polarized component reflected from the polarizing beam splitter 14 to the holographic recording medium 16.

The object optical system 18 is configured to include: a beam expander 18A for expanding the beam diameter of the object beam emitted from the laser beam source 12; a mirror 18B for perpendicularly reflecting the object beam having passed through the beam expander 18A; a spatial light modulator (hereinafter referred to as the SLM) 18C on which the object beam having reflected off the mirror 18B is incident; and a Fourier lens 18D for focusing the object beam having passed through the SLM 18C into the holographic recording medium 16.

On the other hand, the reference optical system 20 is configured to include: a mirror 20A for reflecting an incident reference beam toward the holographic recording medium 16; and two angle adjustment lenses 20B and 20C, in this order from the side of the polarizing beam splitter 14. Note that the mirror 20A is supported by a rotation stage 22 so that the angle of reflection is adjustable, thereby allowing the reference optical system 20 to modulate the incident angle of the reference beam relative to the holographic recording medium 16. That is, the angle multiplex recording is made possible.

Now, an explanation will be given to a process for recording information on the holographic recording medium 16 using the holographic recording apparatus 10.

An object beam which is incident upon the object optical system 18 is reflected by the mirror 18B, and is provided with data in the form of intensity modulation in the SLM 18C. Thereafter, the object beam is converged and subjected to Fourier transform of intensity distribution by the Fourier lens 18D, and is projected onto the holographic recording medium 16.

On the other hand, a reference beam which is incident upon the reference optical system 20 is reflected by the mirror 20A and then passes through the angle adjustment lenses 20B and 20C to intersect the projected object beam within the holographic recording medium 16.

These object and reference beams produce optical interference in a region where both the beams intersect each other, and the optical interference is recorded as diffraction gratings on the holographic recording medium 16.

More specifically, multiple pieces of information are recorded on the holographic recording medium 16 by angle multiplex recording through the processes to be described below. Note that the first embodiment shows an example where four data pages are recorded on a recording layer 16A of the holographic recording medium 16 by angle multiplex recording.

Figure 2:
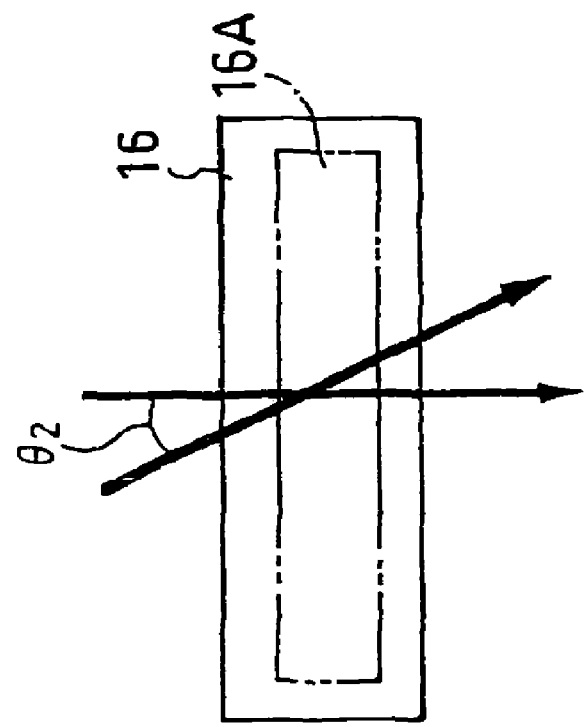
FIG. 2 is a schematic side view illustrating a process of recording on a holographic recording medium of FIG. 1.
Figure 2:
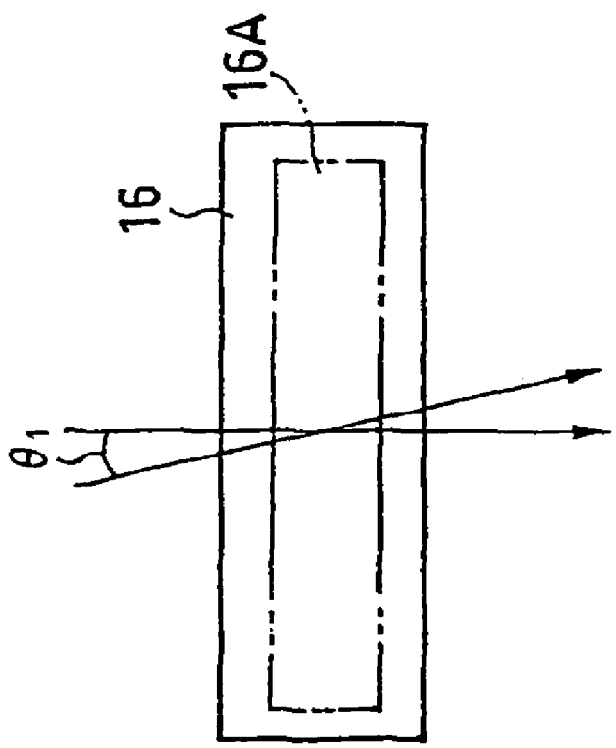

To begin with, as shown in FIG. 2(A), an object beam in a direction orthogonal to the surface of the holographic recording medium 16 and a reference beam at an incident angle $\theta_1$ relative to the object beam are projected onto the holographic recording medium 16 to form the interference fringes of the two beams, thereby recording the first data page.

Then, the laser output power of the laser beam (the object beam and the reference beam) is increased in accordance with a decrease in recording sensitivity of the holographic recording medium 16. Then, as shown in FIG. 2(B), with the object beam kept unchanged as in FIG. 2(A) and with the reference beam at an incident angle $\theta_2$ as in FIG. 2(B), the second data page is multiplex-recorded on the recording layer 16A of the holographic recording medium 16. Note that the time of exposure to the laser beam per data page for recording the second data page is set to be the same as for recording the first data page, thus allowing the time of exposure to the laser beam per data page to be kept constant all the time for recording.

Likewise, for the third and fourth data pages, the laser output power of the laser beam is increased step by step in accordance with a decrease in recording sensitivity of the holographic recording medium 16. The reference beam at an incident angle different from those for the first and second data pages (with the object beam remaining unchanged) is projected onto the recording layer 16A of the holographic recording medium 16, allowing the interference fringes to be used to record information by angle multiplexing.

According to the holographic multiplex recording method of the first embodiment, in the process of multiplex-recording information, the time of exposure to a laser beam per data page is kept constant, and the laser output power of the laser beam is increased in accordance with a decrease in recording sensitivity of the holographic recording medium 16. This makes it possible to keep the recording data rate constant and equalize nonuniformity in recording due to vibrations or the like.

Note that with the first embodiment, such an example has been shown in which the laser output power of the laser beam is increased for each of the four data pages; however, the present invention is not limited thereto. The laser output power of the laser beam may be increased as appropriate in accordance with a decrease in recording sensitivity of the holographic recording medium.

Second Embodiment

Figure 3:
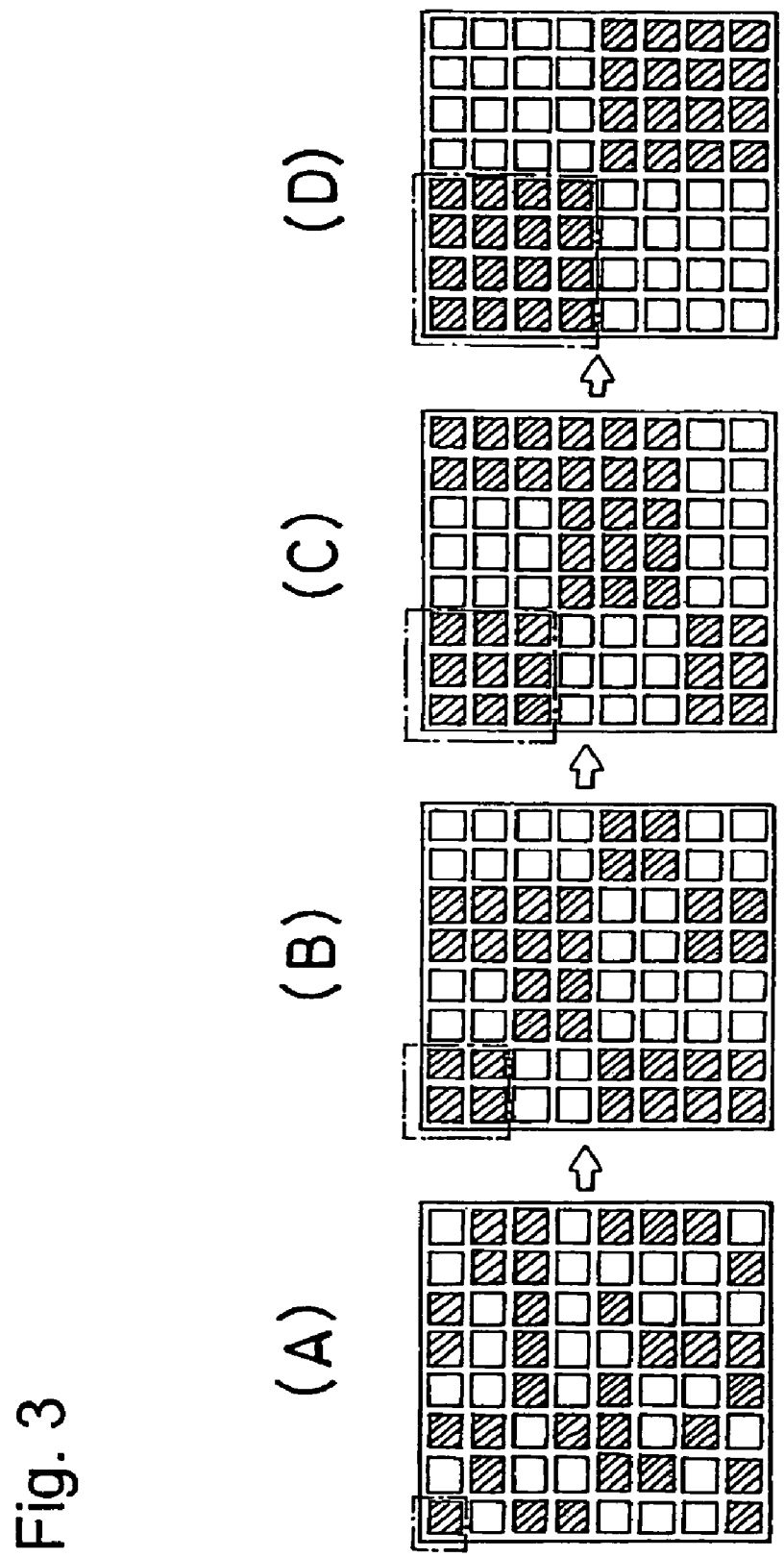
FIG. 3 is a schematic plan view illustrating a holographic multiplex recording method according to a second embodiment of the present invention.
Figure 4:
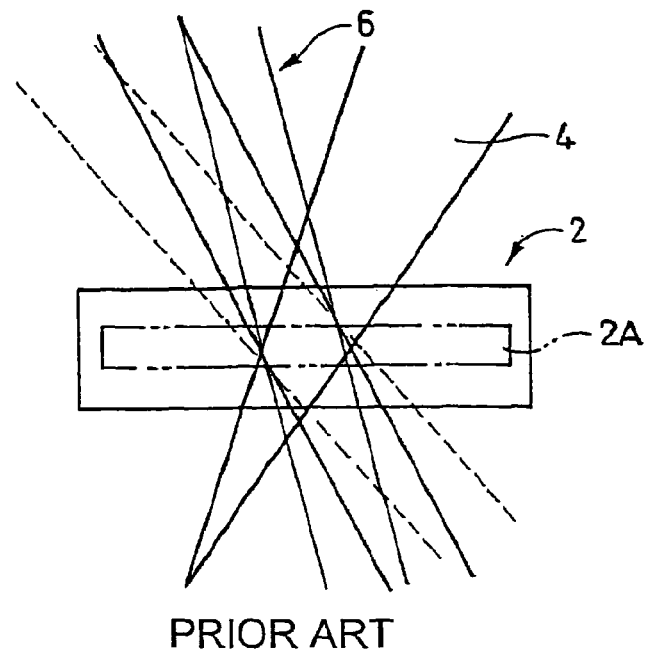
FIG. 4 is a schematic side view illustrating how angle multiplex recording is carried out with a conventional holographic recording apparatus.
Figure 5:
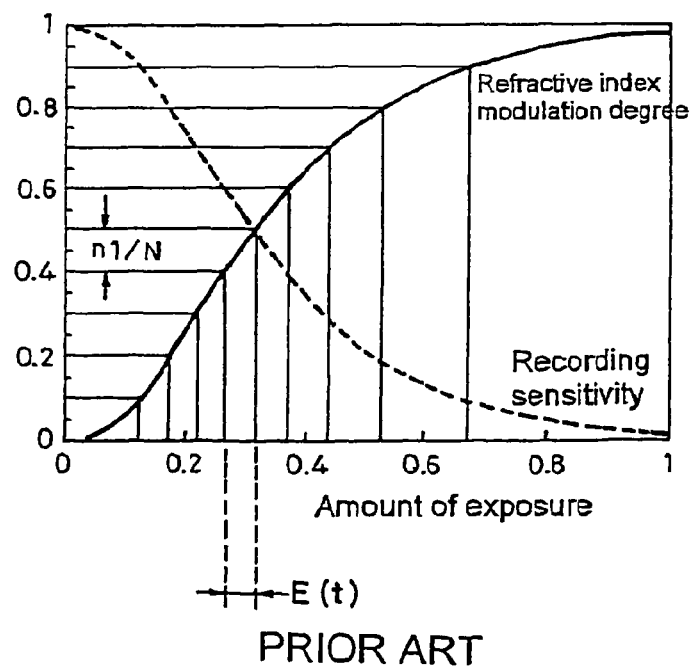
FIG. 5 is a graph showing the relationship among the amount of exposure, the refractive index modulation degree, and the recording sensitivity for a holographic recording medium.

Now, with reference to FIG. 3, an explanation will be given to a holographic multiplex recording method according to a second embodiment of the present invention. Note that FIG. 3 schematically shows some of pixels of the SLM 18C according to the aforementioned first embodiment.

As with the aforementioned first embodiment, an example will be discussed where four data pages are recorded by angle multiplexing on the recording layer 16A of the holographic recording medium 16.

To begin with, the number of pixels of the SLM 18C to be allocated to one bit of information is set to one pixel as shown in FIG. 3(A), and the object beam is intensity modulated by the SLM 18C to record the first data page.

Then, when the recording sensitivity of the holographic recording medium 16 has been reduced to less than or equal to $\frac{1}{4}$ ($=\frac{1}{2^2}$) of the initial value of the recording sensitivity at the time of recording the second data page, the number of pixels of the SLM 18C to be allocated to one bit of information is increased to four pixels formed in a 2 by 2 square grid shape as shown in FIG. 3(B). Then, the object beam is intensity modulated by the SLM 18C to multiplex-record the second data page. Note that the time of exposure to a laser beam per data page and the laser output power for recording the second data page are set to be the same as those for recording the first data page. Thus, the time of exposure to a laser beam per data page and the laser output power are kept constant all the time for recording.

Likewise, at the time of recording the third and fourth data pages, when the recording sensitivity of the holographic recording medium 16 has been reduced to less than or equal to $\frac{1}{9}$ ($=\frac{1}{3^2}$) and $\frac{1}{16}$ ($=\frac{1}{4^2}$) of the initial value of the recording sensitivity, respectively, the number of pixels of the SLM 18C to be allocated to one bit of information is increased to 9 pixels formed in a 3 by 3 square grid shape and 16 pixels formed in a 4 by 4 square grid shape as shown in FIGS. 3(C) and (D), respectively. Then, the object beam is intensity modulated by the SLM 18C to multiplex-record the third and fourth data pages.

As described above, the second embodiment is adapted such that the number of pixels of the SLM 18C to be allocated to one bit of information is increased to $N^2$ when the recording sensitivity of the holographic recording medium 16 has been reduced to less than or equal to $1/N^2$ (N is an integer equal to two or greater) of the initial value of the recording sensitivity.

According to the holographic multiplex recording method of the second embodiment, in the process of multiplex-recording information, the time of exposure to a laser beam per data page and the laser output power are kept constant. Additionally, the number of pixels of the SLM 18C to be allocated to one bit of information is increased in accordance with a decrease in recording sensitivity of the holographic recording medium 16 using the SLM 18C having a plurality of pixels for intensity modulating the object beam. This makes it possible to keep the frame rate constant and thus equalize nonuniformity in recording due to vibrations or the like. Furthermore, since the time of exposure to a laser beam per data page and the laser output power can be kept constant, control can be provided more easily.

In particular, since the pixels of the SLM 18C to be allocated to one bit of information are formed in a square grid shape, it is easy to correlate a pixel of the SLM with a pixel of an imaging device at the time of reproduction. Accordingly, this eliminates the need for providing optical components such as a cylindrical lens for correlating pixels with each other, thereby making it possible to provide apparatuses at reduced size and costs.

Note that the second embodiment is adapted such that the number of pixels of the SLM 18C to be allocated to one bit of information is increased to $N^2$ when the recording sensitivity of the holographic recording medium has been reduced to less than or equal to $1/N^2$ (N is an integer equal to two or greater) of the initial value of the recording sensitivity; however, the present invention is not limited thereto. The number of pixels of the SLM to be allocated to one bit of information may also be increased as appropriate in accordance with a decrease in recording sensitivity of the holographic recording medium.

Furthermore, in the aforementioned first and second embodiments, such an example has been shown where information is multiplex-recorded by angle multiplex recording; however, the present invention is not limited thereto. For example, the holographic multiplex recording method according to the present invention may also be applied to wavelength multiplex recording, peristrophic multiplex recording and so on.

Furthermore, such an example has been shown where four data pages are multiplex-recorded; however, the present invention is not limited thereto, but is also applicable to the case where two or three data pages are multiplex-recorded or five or more data pages are multiplex recorded.

INDUSTRIAL APPLICABILITY

The holographic multiplex recording method according to the present invention, and the holographic recording apparatus and the holographic recording medium, which employ the method, provide excellent effects that the recording data rate can be kept constant and nonuniformity in recording due to vibrations or the like can be equalized.

What is claimed is:

1. A holographic multiplex recording method for multiplex-recording information as a hologram on a holographic recording medium using interference fringes of an object beam and a reference beam, into which a laser beam is split, the method comprising:
    keeping a time of exposure to the laser beam per data page and a laser output power to be constant;
    increasing a number of pixels of a spatial light modulator to be allocated to one bit of the information in accordance with a decrease in recording sensitivity of the holographic recording medium, the spatial light modulator having a plurality of pixels for intensity modulating of the object beam; and
    projecting the object beam onto the holographic recording medium, the object beam being provided with data in the form of intensity modulation in the spatial light modulator.

2. The holographic multiplex recording method according to claim 1, further comprising:
    forming an array of pixels of the spatial light modulator to be allocated to one bit of the information in a square grid shape.

3. The holographic multiplex recording method according to claim 1, further comprising:
    when N is an integer equal to two or greater and a recording sensitivity of the holographic recording medium is reduced to less than or equal to $1/N^2$ of an initial value of the recording sensitivity, increasing the number of pixels of the spatial light modulator to be allocated to one bit of the information to $N^2$.

4. A holographic recording apparatus for multiplex-recording information as a hologram on a holographic recording medium using interference fringes of an object beam and a reference beam, into which a laser beam is split,
    includes a spatial light modulator having a plurality of pixels for intensity modulating of the object beam, and
    wherein in a process of multiplex-recording the information, a time of exposure to the laser beam per data page and a laser output power are kept constant, and a number of pixels of the spatial light modulator to be allocated to one bit of the information is set to increase in accordance with a decrease in recording sensitivity of the holographic recording medium.

5. The holographic recording apparatus according to claim 4, wherein an array of pixels of the spatial light modulator to be allocated to one bit of the information is formed in a square grid shape.

6. The holographic recording apparatus according to claim 4, wherein the number of pixels of the spatial light modulator to be allocated to one bit of the information is set to increase to $N^2$ when N is an integer equal to two or greater and a recording sensitivity of the holographic recording medium is reduced to less than or equal to $1/N^2$ of an initial value of the recording sensitivity.

7. A holographic recording medium on which information is multiplex recorded as a hologram using interference fringes of an object beam and a reference beam, into which a laser beam is split, wherein
    a time of exposure to the laser beam and a laser output power are kept constant, and a spatial light modulator having a plurality of pixels for intensity modulation of the object beam is used to increase a number of pixels of the spatial light modulator to be allocated to one bit of the information in accordance with a decrease in recording sensitivity of the holographic recording medium, thereby allowing the information to be multiplex-recorded.

8. The holographic recording medium according to claim 7, wherein an array of pixels of the spatial light modulator to be allocated to one bit of the information is formed in a square grid shape, thereby allowing the information to be multiplex-recorded.

9. The holographic recording medium according to claim 7, wherein, when N is an integer equal to two or greater and a recording sensitivity of the holographic recording medium is reduced to less than or equal to $1/N^2$ of an initial value of the recording sensitivity, the number of pixels of the spatial light modulator to be allocated to one bit of the information is increased to $N^2$, thereby allowing the information to be multiplex-recorded.

10. The holographic multiplex recording method according to claim 2, further comprising:
    when N is an integer equal to two or greater and a recording sensitivity of the holographic recording medium is reduced to less than or equal to $1/N^2$ of an initial value of the recording sensitivity, increasing the number of pixels of the spatial light modulator to be allocated to one bit of the information to $N^2$.

11. The holographic recording apparatus according to claim 5, wherein the number of pixels of the spatial light modulator to be allocated to one bit of the information is set to increase to $N^2$ when N is an integer equal to two or greater and a recording sensitivity of the holographic recording medium is reduced to less than or equal to $1/N^2$ of an initial value of the recording sensitivity.

12. The holographic recording medium according to claim 8, wherein, N is an integer equal to two or greater and when a recording sensitivity of the holographic recording medium is reduced to less than or equal to $1/N^2$ of an initial value of the recording sensitivity, the number of pixels of the spatial light modulator to be allocated to one bit of the information is increased to $N^2$, thereby allowing the information to be multiplex-recorded.

* * * * *